US011331995B2

(12) United States Patent
Ueki et al.

(10) Patent No.: US 11,331,995 B2
(45) Date of Patent: May 17, 2022

(54) ANTI-VIBRATION DEVICE

(71) Applicant: BRIDGESTONE CORPORATION, Tokyo (JP)

(72) Inventors: Akira Ueki, Tokyo (JP); Yasuyuki Nagashima, Tokyo (JP); Yuki Satake, Tokyo (JP); Kenichiro Iwasaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 39 days.

(21) Appl. No.: 16/643,879

(22) PCT Filed: Dec. 12, 2018

(86) PCT No.: PCT/JP2018/045655
§ 371 (c)(1),
(2) Date: Mar. 3, 2020

(87) PCT Pub. No.: WO2019/117193
PCT Pub. Date: Jun. 20, 2019

(65) Prior Publication Data
US 2021/0061084 A1    Mar. 4, 2021

(30) Foreign Application Priority Data
Dec. 15, 2017  (JP) .............................. JP2017-240143

(51) Int. Cl.
*B60K 5/12*    (2006.01)
*F16F 13/10*   (2006.01)

(52) U.S. Cl.
CPC .......... *B60K 5/1266* (2013.01); *F16F 13/101* (2013.01)

(58) Field of Classification Search
CPC ...... B60K 5/1266; F16F 13/101; F16F 13/10; F16F 13/102; F16F 13/106; F16F 13/107; F16F 13/1409; F16F 13/1427
See application file for complete search history.

(56) References Cited

U.S. PATENT DOCUMENTS 6,053,487 A     4/2000  Yotani et al.
8,695,954 B2 *  4/2014  Ogawa ................. F16F 13/101
                                              267/140.13
(Continued)

FOREIGN PATENT DOCUMENTS

CN    101305205 A    11/2008
CN    101883932 A    11/2010
(Continued)

OTHER PUBLICATIONS

Search Report dated Jan. 4, 2021, from the China National Intellectual Property Administration in application No. 201880060117.5.
(Continued)

*Primary Examiner* — Pamela Rodriguez
(74) *Attorney, Agent, or Firm* — Sughrue Mion, PLLC (57) ABSTRACT

A present invention provides an anti-vibration device (1) which is equipped with a first tubular mounting member (11) connected to one of a vibration generating part and a vibration receiving part, and a second mounting member (12) connected to the other thereof; an elastic body (13) which connects the first mounting member and the second mounting member; and a partition member (16) which partitions a liquid compartment (19) in the first mounting member into a first liquid compartment (14) having the elastic body in a part of a bulkhead, and a second liquid compartment (15) in an axial direction along an central axis of the first mounting member, and has an orifice passage (24) through which the first liquid compartment and the second liquid compartment communicate with each other, in which (Continued)

a plurality of ridge parts (26) extending in a circumferential direction are formed on an inner surface (27) of the elastic body which defines the first liquid compartment in a radial direction.

8 Claims, 3 Drawing Sheets

(56) References Cited

U.S. PATENT DOCUMENTS

| | | |
|---|---|---|
| 2009/0008195 A1 | 1/2009 | Ueki |
| 2012/0091640 A1 | 4/2012 | Ogawa et al. |

FOREIGN PATENT DOCUMENTS

| | | |
|---|---|---|
| CN | 102414474 A | 4/2012 |
| JP | 59-219537 A | 12/1984 |
| JP | 59-219538 A | 12/1984 |
| JP | 10-252807 A | 9/1998 |
| JP | 2003-214482 A | 7/2003 |
| JP | 20082497 A | 1/2008 |
| JP | 2012-107640 A | 6/2012 |
| JP | 2012-122539 A | 6/2012 |

OTHER PUBLICATIONS

International Search Report for PCT/JP2018/045655 dated Feb. 19, 2019 [PCT/ISA/210].
Extended European Search Report dated Aug. 31, 2021 by the European Patent Office in application No. 18889431.5.

\* cited by examiner

ANTI-VIBRATION DEVICE

TECHNICAL FIELD

This application is a National Stage of International Application No. PCT/JP2018/045655 filed Dec. 12, 2018, claiming priority based on Japanese Patent Application No. 2017-240143 filed Dec. 15, 2017.

The present invention relates to an anti-vibration device which is applied to, for example, an automobile, an industrial machine and the like, and attenuates and absorbs vibration of a vibration generating part such as an engine.

BACKGROUND ART

From the related art, as an anti-vibration device of this type, there is known a configuration including a first tubular mounting member connected to one of a vibration generating part and a vibration receiving part, a second mounting member connected to the other thereof, an elastic body which connects the first mounting member and the second mounting member, and a partition member which partitions a liquid compartment in the first mounting member into a first liquid compartment having the elastic body in a part of a bulkhead and a second liquid compartment in an axial direction along a central axis of the first mounting member. The partition member has an orifice passage through which the first liquid compartment and the second liquid compartment communicate with each other. In this anti-vibration device, when vibration is input, the first mounting member and the second mounting member are relatively displaced, while elastically deforming the elastic body, changing a liquid pressure in the first liquid compartment and causing the liquid to flow through the orifice passage, thereby attenuating and absorbing the vibrations.

CITATION LIST

Patent Document

Patent Document 1

Japanese Unexamined Patent Application, First Publication No. 2012-107640

SUMMARY OF INVENTION

Technical Problem

Incidentally, in the anti-vibration device, for example, after a large load (vibration) is input from unevenness or the like of a passage face, and the liquid pressure of the first liquid compartment rapidly rises, when a load is input in an opposite direction due to rebound or the like of the elastic body, the first liquid compartment may rapidly reach a negative pressure. Then, a large number of bubbles are generated in the liquid compartment due to the sudden negative pressure, and an occupant may detect an abnormal noise due to a so-called cavitation collapse in which the bubbles collapse.

The present invention has been made in view of the above circumstances, and an object thereof is to provide an anti-vibration device capable of curbing an occupant detecting an abnormal noise caused by cavitation collapse.

Solution to Problem

According to the present invention, there is provided an anti-vibration device equipped with a first tubular mounting member connected to one of a vibration generating part and a vibration receiving part, and a second mounting member connected to the other thereof; an elastic body which connects the first mounting member and the second mounting member; and a partition member which partitions a liquid compartment in the first mounting member into a first liquid compartment having the elastic body in a part of a bulkhead, and a second liquid compartment in an axial direction along an central axis of the first mounting member and has an orifice passage through which the first liquid compartment and the second liquid compartment communicate with each other, in which a plurality of ridge parts extending in a circumferential direction around the central axis when viewed from the axial direction are formed on an inner surface of the elastic body which defines the first liquid compartment, in a radial direction intersecting the central axis when viewed from the axial direction.

Effects of Invention

According to the present invention, it is possible to suppress an occupant from sensing abnormal noise caused by cavitation collapse.

DESCRIPTION OF EMBODIMENTS

Hereinafter, an embodiment of an anti-vibration device according to the present invention will be described on the basis of FIGS. 1 and 2.

Figure 1:
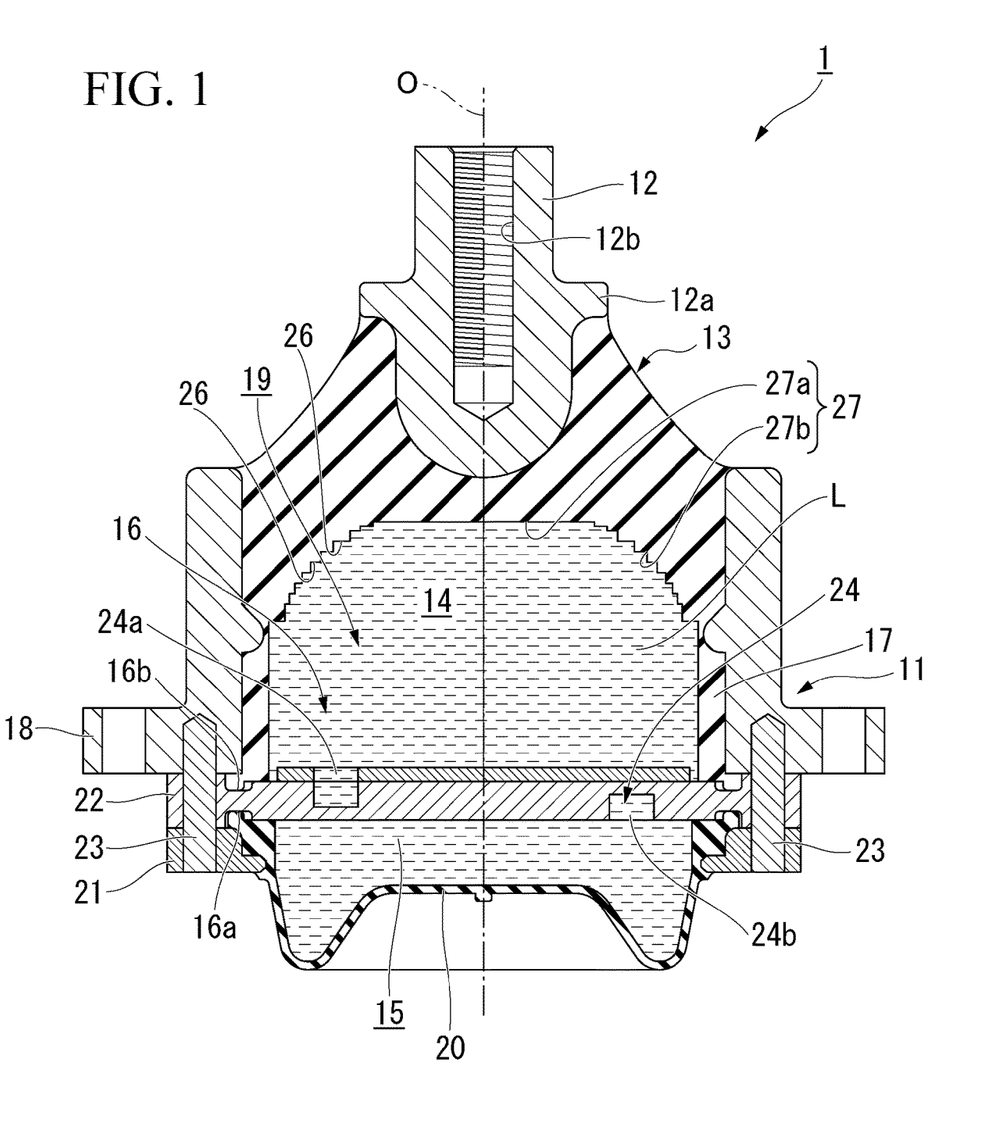
FIG. 1 is a longitudinal sectional view of an anti-vibration device according to a first embodiment of the present invention.
Figure 2:
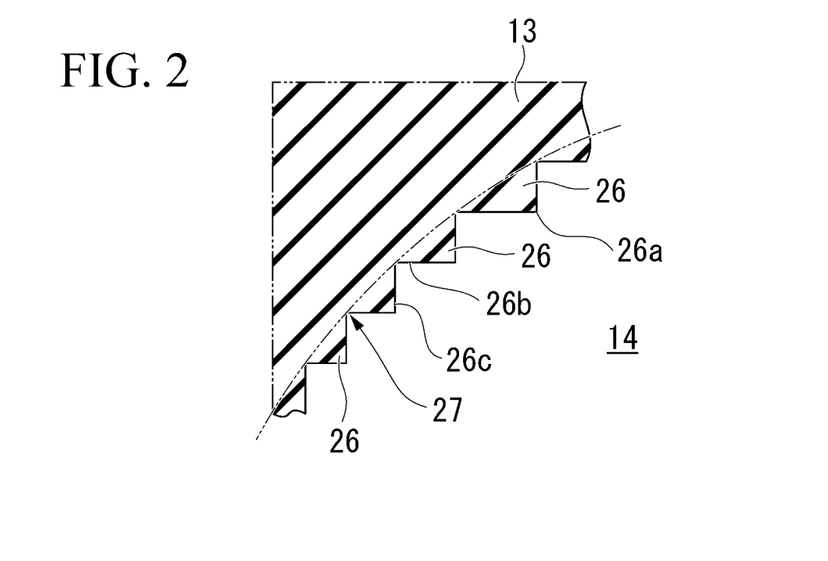
FIG. 2 is a partially enlarged view of an inner surface of an elastic body in the anti-vibration device shown in FIG. 1.

As shown in FIG. 1, an anti-vibration device 1 is a liquid-sealing type anti-vibration device which is equipped with a first tubular mounting member 11 connected to one of a vibration generating part and a vibration receiving part, a second mounting member 12 connected to the other thereof, an elastic body 13 which connects the first mounting member 11 and the second mounting member 12, and a partition member 16 which partitions the interior of the first mounting member 11 into a main liquid compartment (a first liquid compartment) 14 and an auxiliary liquid compartment (a second liquid compartment) 15 to be described later.

When the anti-vibration device 1 is mounted on, for example, an automobile, the second mounting member 12 is connected to an engine as the vibration generating part, and the first mounting member 11 is connected to a vehicle body as the vibration receiving part. This suppresses transmission of engine vibration to the vehicle body.

Hereinafter, a direction along a central axis O of the first mounting member 11 is defined as an axial direction. Further, a second mounting member 12 side along the axial direction is defined as an upper side, and a partition member 16 side is defined as a lower side. Further, in a plan view of the anti-vibration device 1 viewed from the axial direction, a direction intersecting the central axis O is defined as a radial direction, and a direction circling around the central axis O is defined as a circumferential direction.

The first mounting member 11, the second mounting member 12, and the elastic body 13 are each formed in a circular shape or an annular shape in a plan view, and are disposed coaxially with the central axis O.

The second mounting member 12 is a columnar member extending in the axial direction, is formed in a hemispherical shape in which a lower end portion bulges downward, and has a flange part 12a above the lower end portion of the hemispherical shape. A screw hole 12b extending downward from the upper end surface of the second mounting member 12 is formed, and a bolt (not shown) serving as a mounting tool on the engine side is screwed into the screw hole 12b.

The second mounting member 12 is disposed at an upper end opening portion of the first mounting member 11 with the elastic body 13 therebetween.

The elastic body 13 is a rubber body which is vulcanized and bonded to each of the upper end opening portion of the first mounting member 11 and the outer circumferential surface of the lower part of the second mounting member 12, is interposed therebetween, and closes the upper end opening portion of the first mounting member 11 from above. When the upper end portion of the elastic body 13 comes into contact with the flange part 12a of the second mounting member 12, the elastic body 13 sufficiently comes into close contact with the second mounting member 12 to more satisfactorily follow the displacement of the second mounting member 12. A rubber film 17 that covers an inner circumferential surface of the first mounting member 11 and an inner circumferential part of a lower end opening edge in a liquid-tight manner is formed integrally at the lower end portion of the elastic body 13. In addition, as the elastic body 13, it is also possible to use an elastic body made of synthetic resin or the like other than rubber.

The first mounting member 11 is formed in a cylindrical shape having a flange 18 at a lower end portion, and is connected to a vehicle body or the like as the vibration receiving part via the flange 18. A portion of the inside of the first mounting member 11 located below the elastic body 13 is a liquid compartment 19. In the present embodiment, a partition member 16 is provided at a lower end portion of the first mounting member 11, and a diaphragm 20 is provided below the partition member 16. The upper surface of the outer circumferential part 22 of the partition member 16 is in contact with the lower end opening edge of the first mounting member 11.

The diaphragm 20 is made of an elastic material such as rubber or soft resin, and is formed in a bottomed cylindrical shape. The upper end portion of the diaphragm 20 is axially sandwiched between a lower surface of the outer circumferential part 22 of the partition member 16 and a ring-shaped holder 21 located below the partition member 16. The lower end portion of the rubber film 17 is in contact with the upper surface of the outer circumferential part 22 of the partition member 16 in a liquid-tight manner.

With such a configuration, when the outer circumferential part 22 of the partition member 16 and the holder 21 are disposed in this order on the lower end opening edge of the first mounting member 11 in a downward direction and are integrally fixed by screws 23, the diaphragm 20 is attached to the lower end opening portion of the first mounting member 11 via the partition member 16. In the shown example, a bottom part of the diaphragm 20 has a shape that is deep on the outer circumferential side and shallow at the central part. However, as the shape of the diaphragm 20, various conventionally known shapes can also be adopted in addition to such a shape.

Further, when the diaphragm 20 is mounted on the first mounting member 11 via the partition member 16 as described above, the liquid compartment 19 is formed in the first mounting member 11 as described above. The liquid compartment 19 is a sealed space that is disposed inside the first mounting member 11, that is, on the inner side of the first mounting member 11 in a plan view, and is sealed by the elastic body 13 and the diaphragm 20 in a liquid-tight manner. The liquid L is sealed in (filled into) the liquid compartment 19.

The liquid compartment 19 is axially partitioned by the partition member 16 into a main liquid compartment 14 having the elastic body 13 at part of the bulkhead, and an auxiliary liquid compartment 15 having a diaphragm 20 at part of the bulkhead. The main liquid compartment 14 is a space which has an inner surface 27 of the elastic body 13 facing downward as part of a wall surface and is surrounded by the elastic body 13, a rubber film 17 that covers the inner circumferential surface of the first mounting member 11 in a liquid-tight manner, and the partition member 16. An inner volume of the main liquid compartment 14 is changed by the deformation of the elastic body 13. The auxiliary liquid compartment 15 is a space surrounded by the diaphragm 20 and the partition member 16, and the inner volume thereof is changed by the deformation of the diaphragm 20. The anti-vibration device 1 having such a configuration is a compression-type device which is used by being mounted so that the main liquid compartment 14 is located on the upper side in the vertical direction and the auxiliary liquid compartment 15 is located on the lower side in the vertical direction.

A holding groove 16a which holds the upper end portion of the diaphragm 20 in a liquid-tight manner is formed on the lower surface of the outer circumferential part 22 of the partition member 16, and thus, a space between the diaphragm 20 and the lower surface of the outer circumferential part 22 of the partition member 16 is closed in a light-tight manner. A holding groove 16b which holds the lower end portion of the rubber film 17 in a liquid-tight manner is formed on the upper surface of the outer circumferential part 22 of the partition member 16 on the main liquid compartment 14 side, and thus, a space between the rubber film 17 and the upper surface of the outer circumferential part 22 of the partition member 16 is closed in a liquid-tight manner.

An orifice passage 24 through which the main liquid compartment 14 and the auxiliary liquid compartment 15 communicate with each other is formed in the partition member 16. An opening 24a of the orifice passage 24 on the main liquid compartment 14 side opens upward to the main liquid compartment 14, and an opening 24b of the orifice passage 24 on the auxiliary liquid compartment 15 side opens downward to the auxiliary liquid compartment 15.

In the present embodiment, a plurality of circumferentially extending ridge parts 26 are formed on the inner surface 27 of the elastic body 13 that defines the main liquid compartment 14 in the radial direction. The ridge part 26 has such rigidity (size) that it is not deformed by an impact force caused by cavitation collapse.

In the shown example, the ridge part 26 has a corner part 26a that points toward the inside of the main liquid compartment 14. The ridge part 26 extends continuously over the entire circumference. The plurality of ridge parts 26 are formed in shapes equivalent to each other. At least some parts of the plurality of ridge parts 26 located at the intermediate part in the radial direction are formed to have the same size as each other. The shapes of at least some parts of the plurality of ridge parts 26 may be different from each other.

Here, the inner surface 27 of the elastic body 13 includes a circumferential surface 27b that gradually extends downward toward the outside in the radial direction. In the shown example, the inner surface 27 of the elastic body 13 includes a top surface 27a located at the upper end and facing downward, and a circumferential surface 27b gradually extending outward in the radial direction from the outer circumferential edge of the top surface 27a toward the lower side. The circumferential surface 27b is formed in a curved shape that is depressed outward in the radial direction.

The inner surface 27 of the elastic body 13 may be appropriately changed, for example, by adopting a configuration in which the circumferential surface 27b gradually and linearly extends downward toward the outer side in the radial direction, or a configuration made up of one of the top surface 27a and the circumferential surface 27b.

The ridge part 26 is formed on the circumferential surface 27b of the inner surface 27 of the elastic body 13. The ridge part 26 is formed over the entire region of the circumferential surface 27b. As shown in FIG. 2, the ridge part 26 includes a first surface 26b which protrudes radially inward from the inner surface 27 of the elastic body 13, and a second surface 26c which protrudes downward from the inner surface 27 of the elastic body 13 and is connected to an inner end in the radial direction of the first surface 26b, and the inner end in the radial direction of the first surface 26b and the lower end of the second surface 26c are connected via the corner part 26a.

The plurality of ridge parts 26 are disposed by being connected to the circumferential surface 27b in the radial direction. That is, the plurality of ridge parts 26 are disposed on the circumferential surface 27b in a state in which the radially outer end of the first surface 26b of one ridge part 26 among the ridge parts 26 adjacent to each other, and the upper end of the second surface 26c of the other ridge part 26 are connected to each other.

A part of the ridge part 26 faces the opening 24a of the orifice passage 24 on the main liquid compartment 14 side in the axial direction.

In the anti-vibration device 1 having such a configuration, the first mounting member 11 and the second mounting member 12 are relatively displaced, while elastically deforming the elastic body 13 when a vibration is input. Then, the liquid pressure of the main liquid compartment 14 fluctuates, the liquid L in the main liquid compartment 14 flows into the auxiliary liquid compartment 15 through the orifice passage 24, and the liquid L in the auxiliary liquid compartment 15 flows into the main liquid compartment 14 through the orifice passage 24.

As described above, according to the anti-vibration device 1 of the present embodiment, since the ridge part 26 is formed on the inner surface 27 of the elastic body 13, when a large load is input to the anti-vibration device 1, and the main liquid compartment 14 rapidly reaches a negative pressure, bubbles are preferentially generated in the ridge parts 26, the sudden negative pressure of the main liquid compartment 14 can be reduced by the bubbles, and it is possible to curb generation of bubbles, for example, inside the orifice passage 24 and in the liquid.

Therefore, even if the bubbles collapse, by causing most of the bubbles generated in the liquid compartment 19 to collapse on the inner surface 27 of the elastic body 13 to mainly receive the impact force caused by the collapse with the elastic body 13, it is possible to effectively attenuate and absorb the impact force, and it is possible to curb transmission of the impact force to other members such as the first mounting member 11.

Further, since a large area for the smooth surface cannot be secured in the ridge part 26, it is possible to curb growth of the bubbles generated in the ridge part 26. Therefore, most of the bubbles generated at the time of negative pressure in the main liquid compartment 14 can be kept small without growth, and even if the bubbles collapse, the impact force which generated can be reduced such that it is low.

From above, it is possible to suppress an occupant from sensing abnormal noise caused by cavitation collapse.

Further, since the ridge part 26 is formed on the inner surface 27 of the elastic body 13 and the surface area of the inner surface 27 of the elastic body 13 is large, bubbles can be generated over a wide range on the inner surface 27 of the elastic body 13 at the time of the negative pressure of the main liquid compartment 14, and it is possible to reliably curb generation of bubbles at locations other than the inner surface 27 of the elastic body 13.

Further, since the ridge parts 26 extend in the circumferential direction, by forming the ridge parts 26 on the inner surface 27 of the elastic body 13, it is possible to curb increase in the spring in the axial direction of the elastic body 13.

Further, since the ridge part 26 has such a rigidity (size) that it is not deformed by the impact force caused by cavitation collapse, it is difficult for the ridge part 26 to be deformed at the time of a sudden negative pressure in the main liquid compartment 14, and it is possible to reliably realize bubbles being preferentially generated in the ridge parts 26.

Further, when a large load is input to the anti-vibration device 1 and the main liquid compartment 14 rapidly becomes a negative pressure, at least some parts of the ridge part 26 are located in a portion of the inner surface 27 of the elastic body 13 which faces the opening 24a of the orifice passage 24 on the main liquid compartment 14 side in the axial direction, and in which liquid having a relatively high flow velocity flows and a large negative pressure is easily applied. Accordingly, when the main liquid compartment 14 rapidly becomes a negative pressure, bubbles are reliably generated at least in a portion of the ridge part 26 which faces the opening 24a of the orifice passage 24 on the main liquid compartment 14 side in the axial direction. Therefore, since it is possible to reduce the negative pressure in the portion of the main liquid compartment 14 which faces the opening 24a of the orifice passage 24 on the main liquid compartment 14 side in the axial direction, and in which the negative pressure relatively easily increases and bubbles are easily generated in the liquid, it is possible to effectively suppress the generation of bubbles at locations other than the inner surface 27 of the elastic body 13 at the time of the rapid negative pressure of the main liquid compartment 14.

Further, since the ridge part 26 has the corner part 26a pointing toward the inside of the main liquid compartment 14, when the main liquid compartment 14 rapidly becomes a negative pressure, by preferentially generating the bubbles at the corner part 26a of the ridge part 26, it is possible to reliably realize that bubbles are kept small without growth.

Also, since the ridge parts 26 extend continuously over the entire circumference, it is possible to easily increase the surface area of the inner surface 27 of the elastic body 13.

Figure 3:
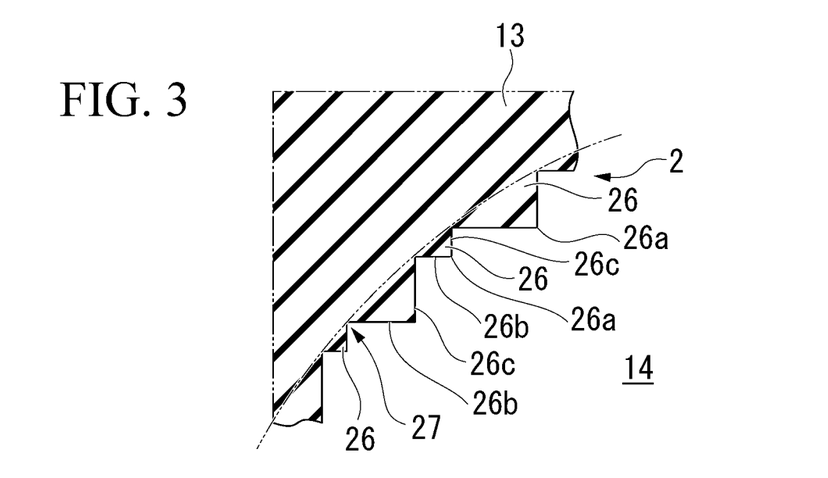
FIG. 3 is a partially enlarged view of an inner surface of an elastic body in an anti-vibration device according to a second embodiment of the present invention.

Next, an anti-vibration device 2 according to a second embodiment of the present invention will be described while referring to FIG. 3.

In the second embodiment, constituent elements which are parts which are the same as in the first embodiment are denoted by the same reference numerals, description thereof will not be provided, and only differences will be described.

In the anti-vibration device 2, the sizes of ridge parts 26 adjacent to each other are different. In the shown example, small ridge parts 26 and large ridge parts 26 having the same shape are alternately disposed in the radial direction.

In such a configuration, the same operational effects as those of the above-described embodiment can be obtained.

Figure 4:
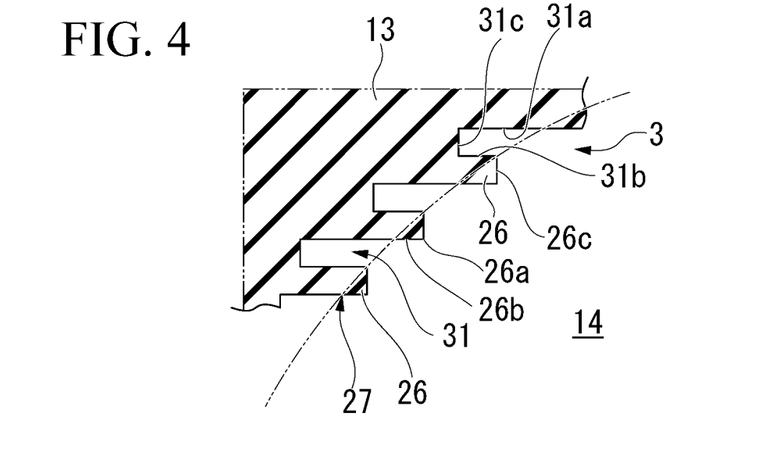
FIG. 4 is a partially enlarged view of an inner surface of an elastic body in an anti-vibration device according to a third embodiment of the present invention.

Next, an anti-vibration device 3 according to a third embodiment of the present invention will be described, while referring to FIG. 4.

In the third embodiment, the same parts as constituent elements in the first embodiment are denoted by the same reference numerals, the description thereof will not be provided, and only differences will be described.

In the anti-vibration device 3, the ridge parts 26 and the groove parts 31 extending in the circumferential direction are disposed on the inner surface 27 of the elastic body 13 to be alternately continuous in the radial direction. In the shown example, the groove part 31 is recessed radially outward from the inner surface 27 of the elastic body 13. The groove part 31 includes an upper surface 31a which is located above and faces downward, a lower surface 31b which is located below and faces upward, and a bottom surface 31c which connects the radially outer ends of each of the upper surface 31a and the lower surface 31b and faces the radially inner side. The upper surface 31a of the groove part 31 is continuous with the radially outer end of the first surface 26b of the ridge part 26 without a step, and the lower surface 31b of the groove part 31 is continuous with the upper end of the second surface 26c of the ridge part 26. The groove part 31 extends continuously over the entire circumference. Further, the groove part 31 may extend intermittently in the circumferential direction.

In such a configuration, the same operational effect as that of the above-described embodiment can be obtained.

Figure 5:
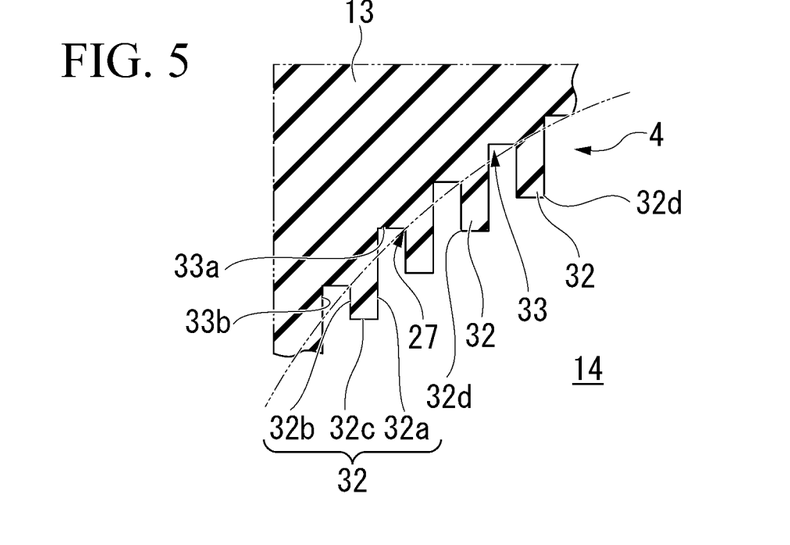
FIG. 5 is a partially enlarged view of an inner surface of an elastic body in an anti-vibration device according to a fourth embodiment of the present invention.

Next, an anti-vibration device 4 according to a fourth embodiment of the present invention will be described, while referring to FIG. 5.

In the fourth embodiment, the same parts as constituent elements in the third embodiment are denoted by the same reference numerals, description thereof will not be provided, and only differences will be described.

In the anti-vibration device 4, a ridge part 32 includes an inner circumferential surface 32a which protrudes downward from the inner surface 27 of the elastic body 13 and faces the radially inner side, an outer circumferential surface 32b which is located radially outward from the inner circumferential surface 32a, protrudes downward from the inner surface 27 of the elastic body 13 and faces radially outwards, and a lower surface 32c which connects each of the lower ends of the inner circumferential surface 32a and the outer circumferential surface 32b and faces downward.

In the ridge part 32, each of the lower end of the inner circumferential surface 32a and the outer circumferential surface 32b is connected to the lower surface 32c via a corner part 32d that points toward the inside of the main liquid compartment 14.

The groove part 33 is recessed upward from the inner surface 27 of the elastic body 13. The groove part 33 includes an upper surface 33a which extends radially outward from the upper end of the outer circumferential surface 32b of the ridge part 32 and faces downward, and a side surface 33b which extends downward from the radially outer end of the upper surface 33a and is connected to the upper end of the inner circumferential surface 32a of the ridge part 32 without any step.

In such a configuration, the same operational effect as those of the above-described embodiment can be obtained.

The technical scope of the present invention is not limited to the above-described embodiment, and various changes can be made without departing from the spirit of the present invention.

For example, although the configuration in which the ridge parts 26 and 32 have the corner parts 26a and 32d pointing toward the inside of the main liquid compartment 14 has been described in the above-described embodiment, a ridge part having no corner parts 26a and 32d and formed in a protruding curved shape may be adopted.

Further, although the configuration in which the ridge parts 26 and 32 extend continuously over the entire circumference has been described in the above-described embodiment, a ridge part that intermittently extends in the circumferential direction may be adopted.

Although the partition member 16 is disposed at the lower end portion of the first mounting member 11 and the outer circumferential part 22 of the partition member 16 is brought into contact with the lower end opening edge of the first mounting member 11 in the above-described embodiment, for example, by disposing the partition member 16 sufficiently above the lower end opening edge of the first mounting member 11 and by disposing the diaphragm 20 below the partition member 16, that is, at the lower end portion of the first mounting member 11, the auxiliary liquid compartment 15 may be formed from the lower end portion of the first mounting member 11 to the bottom surface of the diaphragm 20.

Further, although the compression type anti-vibration devices 1 to 4 in which a positive pressure acts on the main liquid compartment 14 when a support load acts thereon have been described in the above-described embodiment, the invention is also applicable to a suspension type anti-vibration device, which is mounted so that the main liquid compartment 14 is located on the lower side in the vertical direction and the auxiliary liquid compartment 15 is located on the upper side in the vertical direction, and in which a negative pressure acts on the main liquid compartment 14 when a support load acts thereon.

Further, although the partition member 16 partitions the liquid compartment 19 in the first mounting member 11 into the main liquid compartment 14 having the elastic body 13 in part of the bulkhead and the auxiliary liquid compartment 15 in the above-described embodiment, the embodiments are not limited thereto. For example, an elastic body may be provided instead of providing the diaphragm 20, and a pressure receiving liquid compartment having the elastic body in part of the bulkhead may be provided, instead of providing the auxiliary liquid compartment 15. For example, the embodiment may be appropriately changed to another configuration in which the partition member 16 partitions the liquid compartment 19 in the first mounting member 11 with the liquid L sealed therein into a first liquid compartment 14 and a second liquid compartment 15, and at least one of the first liquid compartment 14 and the second liquid compartment 15 has the elastic body 13 in part of the bulkhead.

Further, the anti-vibration devices 1 to 4 according to the present invention are not limited to the engine mount of the vehicle, but can also be applied to mount other than the engine mount. For example, the present invention can also be applied to a mount of a generator mounted on a construction machine, or can also be applied to a mount of a machine installed in a factory or the like.

According to the present invention, since the ridge part is formed on the inner surface of the elastic body, when a large load is input to the anti-vibration device and the first liquid compartment rapidly becomes a negative pressure, by preferentially generating bubbles in the ridge part, it is possible to suppress a rapid negative pressure of the first liquid compartment by the bubbles, thereby suppressing the generation of bubbles inside, for example, the orifice passage, in the liquid, and the like.

Therefore, even if the bubbles collapse, by causing most of the bubbles generated in the liquid compartment to collapse on the inner surface of the elastic body, the impact force caused by the collapse is mainly received by the elastic body, it is possible to effectively attenuate and absorb the impact force, and it is possible to suppress the transmission of the impact force to other members such as the first mounting member.

Further, since a large smooth surface area cannot be ensured in the ridge part, it is possible to suppress the growth of bubbles generated in the ridge part. Therefore, it is possible to keep most of the bubbles generated at the time of negative pressure in the first liquid compartment without growth, and to suppress the generated impact force low even if the bubbles collapse.

From the above, it is possible to suppress the occupant from sensing abnormal noise caused by cavitation collapse.

In addition, since a ridge part is formed on the inner surface of the elastic body and the surface area of the inner surface of the elastic body is large, bubbles can be generated over a wide range on the inner surface of the elastic body when the first liquid compartment is under negative pressure, and it is possible to reliably suppress the generation of bubbles at locations other than the inner surface of the elastic body.

Since the ridge parts extend in the circumferential direction, by forming the ridge parts on the inner surface of the elastic body, it is possible to suppress an increase in the spring in the axial direction of the elastic body.

Further, when the ridge part has such rigidity (size) that it does not deform by the impact force caused by the cavitation collapse, the ridge part is hard to deform at the time of a rapid negative pressure of the first liquid compartment, and it is possible to reliably realize that the bubbles are preferentially generated in the ridge parts.

Here, at least part of the ridge part may face the opening of the orifice passage on the first liquid compartment side in the axial direction.

In this case, when a large load is input to the anti-vibration device and the first liquid compartment rapidly becomes a negative pressure, at least part of the ridge part is located in a portion of the inner surface of the elastic body which faces the opening of the orifice passage on the first liquid compartment side in the axial direction, and in which the liquid having a relatively high flow velocity flows and a large negative pressure is easily applied. Thus, when the first liquid compartment rapidly becomes a negative pressure, bubbles are reliably generated in at least the portion of the ridge part that faces the opening of the orifice passage on the first liquid compartment side in the axial direction. Therefore, since it is possible to suppress the negative pressure of the portion of the first liquid compartment which faces the opening of the orifice passage on the first liquid compartment side in the axial direction, and in which the negative pressure relatively easily increases and bubbles are easily generated in the liquid, it is possible to effectively suppress the generation of bubbles at locations other than the inner surface of the elastic body at the time of the rapid negative pressure of the first liquid compartment.

Further, the ridge part may have a corner part which points toward the inside of the first liquid compartment.

In this case, since the ridge part has the corner part which points toward the inside of the first liquid compartment, when the first liquid compartment rapidly becomes a negative pressure, it is possible to reliably realize that bubbles are preferentially generated at the corner part of the ridge part, and the bubbles are kept small without growth.

Further, the ridge part may extend continuously over the entire circumference.

In this case, since the ridge part extends continuously over the entire circumference, the surface area of the inner surface of the elastic body can be easily increased.

Otherwise, it is possible to appropriately replace the components in the above-described embodiment with well-known components without departing from the spirit of the present invention, and the above-described modified examples may be appropriately combined.

INDUSTRIAL APPLICABILITY

According to this invention, it is possible to suppress an occupant from sensing the abnormal noise caused by cavitation collapse.

REFERENCE SIGNS LIST 1 to 4 Anti-vibration device
11 First mounting member
12 Second mounting member
13 Elastic body
14 Main liquid compartment (first liquid compartment)
15 Auxiliary liquid compartment (second liquid compartment)
16 Partition member
19 Liquid compartment
24 Orifice passage
24a Opening of orifice passage on main liquid compartment side
26, 32 Ridge part
26a, 32d Corner part
27 Inner surface of elastic body
L Liquid
O Central axis

The invention claimed is:

1. An anti-vibration device comprising:
a first tubular mounting member connected to one of a vibration generating part and a vibration receiving part, and a second mounting member connected to the other thereof;
an elastic body which connects the first mounting member and the second mounting member; and
a partition member which partitions a liquid compartment in the first mounting member into a first liquid compartment having the elastic body in a part of a bulkhead, and a second liquid compartment in an axial direction along an central axis of the first mounting member, and has an orifice passage through which the first liquid compartment and the second liquid compartment communicate with each other,
wherein a plurality of ridge parts extending in a circumferential direction around the central axis when viewed from the axial direction are formed on an inner surface of the elastic body which defines the first liquid compartment, in a radial direction intersecting the central axis when viewed from the axial direction, the plurality of ridge parts are continuously disposed on the inner surface of the elastic body in the radial direction, and an end portion on one side in the axial direction of one ridge part of the plurality of ridge parts is connected to an end portion on the other side in the axial direction of another ridge part of the plurality of ridge parts which is adjacent to the one ridge part in the radial direction.

2. The anti-vibration device of claim 1, wherein at least some parts of the ridge parts face an opening of the orifice passage on the first liquid compartment side in the axial direction.

3. The anti-vibration device of claim 2, wherein the ridge parts have a corner part which points toward the first liquid compartment.

4. The anti-vibration device of claim 3, wherein the ridge parts extend continuously over an entire circumference.

5. The anti-vibration device of claim 2, wherein the ridge parts extend continuously over an entire circumference.

6. The anti-vibration device of claim 1, wherein the ridge parts have a corner part which points toward the first liquid compartment.

7. The anti-vibration device of claim 6, wherein the ridge parts extend continuously over an entire circumference.

8. The anti-vibration device of claim 1, wherein the ridge parts extend continuously over an entire circumference.

* * * * *